United States Patent
van den Berg

(12) 
(10) Patent No.: US 6,263,832 B1
(45) Date of Patent: Jul. 24, 2001

(54) METHOD OF AUTOMATICALLY MILKING AND FEEDING ANIMALS, AS WELL AS AN IMPLEMENT AND A FEEDING STALL SUITABLE FOR SAME

(75) Inventor: Karel van den Berg, Bleskensgraaf (NL)

(73) Assignee: Maasland M.V. A dutch limited liability Co., Maasland (NL)

( * ) Notice: Subject to any disclaimer, the term of this patent is extended or adjusted under 35 U.S.C. 154(b) by 0 days.

(21) Appl. No.: 09/456,418

(22) Filed: Dec. 8, 1999

(30) Foreign Application Priority Data

Dec. 9, 1998 (NL) .................................... 1010764

(51) Int. Cl.⁷ ....................................... A01J 1/12
(52) U.S. Cl. ......................................... 119/14.08; 119/840
(58) Field of Search ............................ 119/14.01, 14.02, 119/14.03, 14.08, 51.02, 840

(56) References Cited

U.S. PATENT DOCUMENTS 5,771,837 * 6/1998 van der Lely ..................... 119/14.02
5,778,820 * 7/1998 van der Lely et al. ............ 119/14.02
5,791,284 * 8/1998 van der Lely ..................... 119/14.02
6,019,061 * 2/2000 Schulte ............................... 119/14.02

* cited by examiner

*Primary Examiner*—Thomas Price
(74) *Attorney, Agent, or Firm*—Penrose Lucas Albright

(57) ABSTRACT

In a method of automatically feeding and milking animals which are allowed to visit individually a milking parlor provided with a milking robot and a feeding station as well as a separate feeding stall provided with a further feeding station, an animal visiting the milking parlor is identified and the current value of an individual milking parameter for the animal is determined, on the basis of which current value there is decided whether or not the animal will be milked and fed during milking. When visiting the separate feeding stall, an animal is identified and the current value of the individual milking parameter for the animal is determined as well, while, on the basis of said current value there is decided whether or not the animal will be fed. In this manner it is achieved that the animals, while visiting the milking robot sufficiently often, are also enabled to eat enough feed/concentrate.

19 Claims, No Drawings

METHOD OF AUTOMATICALLY MILKING AND FEEDING ANIMALS, AS WELL AS AN IMPLEMENT AND A FEEDING STALL SUITABLE FOR SAME

The invention relates to a method as described in the preamble of claim 1. The invention further relates to an implement which is suitable for performing the method. The invention also relates to a feeding stall which is adapted for being used in the method.

Such a method is known. When, while applying such a method, an animal wishes to visit the milking parlour, it is identified and, with the aid of a time-dependent individual milking parameter for the animal, there is decided on the basis of an admittance criterion (for admitting the animal to the milking parlour) and/or a milking criterion (for connecting the teat cups of the milking robot to the animal's udder) whether or not the animal should be milked. When the milking parameter does not meet the criterion, the animal is either not admitted to the milking parlour or is removed therefrom.

The milking parlour comprises a feeding station in which e.g. concentrate is supplied to an animal during milking. The feeding station serves primarily as a lure means to stimulate the animals to present themselves sufficiently often for being milked. The further feeding station in the separate feeding stall serves to supply additional feed/concentrate and/or silage to animals which do not eat enough feed/concentrate and/or silage during milking in the milking parlour.

The known method has the disadvantage that animals sometimes eat so much concentrate in the further feeding station that the perspective of being supplied with concentrate at the milking robot is no longer attractive enough to them for being lured sufficiently often to the milking parlour. As a result thereof it is not possible to milk these animals sufficiently often. Implementing in an analogous manner an admittance criterion at the feeding station by means of an individual feeding parameter for each animal cannot solve this problem, because this measure does not take into account the animals' visits to the milking parlour with the integrated feeding station.

The invention aims at providing an improved method. According to the invention this is achieved by means of the measures mentioned in the characterizing part of claim 1.

The invention is based on the insight that by coupling an admittance criterion for the feeding stall to the existing admittance criterion for the milking parlour it can be achieved that the animals, whilst visiting the milking robot sufficiently often, are also enabled to eat enough feed/concentrate. This can be effected e.g. in a simple manner by ensuring that an animal eligible to be milked is not fed in the feeding stall but is only admitted to the feeding stall after having been milked.

Accordingly, at each visit of an animal, e.g. a cow, to the separate feeding stall, the animal is identified and the current value of the individual milking parameter for the animal is determined. On the basis of said current value there is decided whether or not the animal will be fed. If the current value of the (time-dependent) individual milking parameter is within a first range (or interval), the relevant animal, when visiting the milking parlour, is milked and fed during milking, and, if the current value of the time-dependent individual milking parameter is within a second range, the relevant animal is fed when visiting the feeding stall. The first and second range are chosen in such a manner that they do not overlap one another. Consequently, an animal eligible to be milked at a given moment is not fed in the separate feeding stall at that moment, and an animal eligible to be fed in the separate feeding stall at a given moment is not milked at that moment. Only after the animal has been milked (while the time-dependent individual milking parameter discontinuously switches from one range to the other), it is admitted to the separate feeding stall.

The first and second range are preferably chosen in such a manner that they are not directly adjacent one to another. As a result thereof it is achieved that, if the milking parameter is within a specific (intermediate) interval, the animal is neither milked nor fed in the separate feeding stall. In a later stage it is possible to milk the animal in the milking parlour and to feed it during milking. In this manner there is guaranteed a sufficiently high visit frequency of the animal to the milking parlour.

As a (time-dependent) individual milking parameter for an animal may be chosen e.g. the number of milkings effected in the milking parlour since the last milking of the relevant animal. It is also possible to choose the period of time elapsed since the last milking of the relevant animal, or the current estimated milk yield of the relevant animal. As a first range may be used the values above a specific adjustable threshold value and as a second range the values below an adjustable percentage of the adjustable threshold value. As an adjustable percentage 80 may preferably be used.

After a milking of the relevant animal the individual milking parameter has the value zero and then increases in the course of time. In this second range or interval, which is determined according to the invention by the milking behaviour of the animal and not by its eating behaviour, the animal may be fed when visiting the separate feeding stall. When after some time the milking parameter has reached e.g. 80% of the adjustable threshold value, the second interval ends and consequently the animal is no longer allowed to eat in the separate feeding stall. In this intermediate interval the animal is not yet allowed to be milked in the milking parlour. When the milking parameter has increased further and later on reaches the adjustable threshold value, the first range or interval begins and the animal, when visiting the milking parlour, is allowed to be milked and be fed during milking. At the next milking the milking parameter is reset at zero, and the cycle recommences.

When an animal visits the milking parlour while the current individual milking parameter is within the first range, the animal will be admitted, unless, of course, the milking robot is already occupied by another animal or is just in a cleaning or maintenance stage. Then there is tried to connect the teat cups of the milking robot to the animal's udder and to milk the animal. During milking the animal can eat concentrate by means of the integrated feeding station. After the animal has been milked or after a specific number of unsuccessful attempts to connect the milking robot to the animal's udder has been made, the animal is chased away from the milking parlour in a manner known per se.

After having been milked the animal, if still needing additional concentrate, is allowed to eat same in the separate feeding stall. This is possible for the animal until the moment when it is (almost) again eligible to be milked. Consequently, according to the invention, the additional feeding of each animal is controlled depending on the milking behaviour of the relevant animal: the individual feeding criterion is related to the individual milking criterion for the relevant animal.

The method can be implemented in a customary manner with the aid of animal identification means known per se and a computer connected thereto.

Having disclosed our invention, what we claim as new and to be secured by Letters Patent of the United States of America is:

1. A method of automatically feeding and milking animals which are allowed to walk about freely in an area intended therefor and to visit individually a milking compartment provided with a milking robot and a feeding station, as well as to visit a separate feeding stall provided with a further feeding station, in which method an animal visiting the milking compartment is identified and the current value of an individual milking parameter for the animal is determined, on the basis of which value there is further determined whether or not the animal will be milked and fed during its current visit to said milking compartment, the method further comprising that an animal visiting the separate feeding stall is identified and the current value of the individual milking parameter for said animal is determined, on the basis of which value there is further determined whether or not the animal will be fed in said separate feeding stall.

2. A method in accordance with claim 1, wherein said individual milking parameter comprises a first range and a second range, and if and only if the current value of the individual milking parameter of an animal is within said first range, the relevant animal, when visiting the milking compartment, will be milked and fed during milking, and if and only if the current value of the individual milking parameter of the animal is within said second range, the relevant animal, when visiting the feeding stall, will be fed, said first range and said second range not overlapping one with another.

3. A method in accordance with claim 2, wherein said first range and said second range are not directly adjacent but are separated by a third range, while, if the current value of the individual milking parameter of the animal is within the third range, the animal, when visiting the milking compartment, will not be milked and, when visiting the separate feeding stall, will not be fed.

4. A method in accordance with claim 3, wherein the number of milkings effected since the last milking of a relevant animal comprises an individual milking parameter for the relevant animal.

5. A method in accordance with claim 4, wherein values above a specific adjustable threshold value comprise said first range and the values below a selected percentage of said adjustable threshold value comprise said second range.

6. A method in accordance with claim 5, wherein said selected percentage is about eighty percent.

7. A method in accordance with claim 3, wherein a selected period of time which elapsed since the last milking of a relevant animal comprises an individual milking parameter for the relevant animal.

8. A method in accordance with claim 7, wherein values above a specific adjustable threshold time comprise said first range and values below a selected percentage of said adjustable threshold time comprise said second range.

9. A method in accordance with claim 8, wherein said selected percentage is about eighty percent.

10. A method in accordance with claim 3, wherein the current estimated milk yield of a relevant animal comprises an individual milking parameter for said relevant animal.

11. A method in accordance with claim 10, wherein values above a specific adjustable threshold value comprise said first range and values below an adjustable percentage of said adjustable threshold value comprise said second range.

12. A method in accordance with claim 11, wherein said adjustable percentage is about eighty percent.

13. A method in accordance with claim 1, wherein said feeding station and said further feeding station provide feed which consists of concentrate or silage or both is provided to said animals.

14. An implement for milking and feeding animals comprising a milking compartment which is provided with a milking robot, an animal identification means and a feeding station, a separate feeding stall which is provided with a further feeding station and further animal identification means, a computer control means associated with said milking compartment and said feeding station which controls the availability of a relevant animal to be milked in said milking compartment during a first range and a second range which are non-overlapping by denying said relevant animal to be again milked immediately following a milking of the relevant animal during said second range while permitting said relevant animal to consume feed at said further feeding station during said second range, which commences when said relevant animal has been milked, said first range commencing when it is determined that said relevant animal is again entitled to be milked wherein said relevant animal is permitted to enter said milking compartment and consume feed from said feeding station therein but is not permitted to consume feed from said further feed station.

15. A method of controlling a fully automated system of milking animals wherein the animals which are milked voluntarily visit a milking compartment having a robotic means for milking and simultaneously feeding animals that enter therein, and wherein the animals are also provided feeding stalls for feeding animals that enter said stalls, said milking compartments and said stalls being provided with animal identification means and computer control means, the method comprising:

determining for each animal a first range between when the relevant animal becomes eligible to be milked and when it has been milked and a second range commencing after the relevant animal has been milked and is not yet eligible to be milked again;

limiting the availability of said animals to be milked again immediately after having been milked during said second range;

making said stalls available for each animal to be fed during said second range only;

limiting the availability of each said animal to be fed in said stalls during a third range which commences for each relevant animal after said second range has been completed, and thereafter making said milking compartment available for milking and simultaneously feeding each said animal during said first range; and limiting the availability of both said milking compartment and said stalls for feeding purposes to said animals during said third range.

16. A method in accordance with claim 15, wherein each said animal is provided with an individual threshold value which marks for such animal the end of said third range and the beginning of said first range.

17. A method in accordance with claim 16, wherein said threshold value is based on the number of other animals that have been milked since such animal was last milked.

18. A method in accordance with claim 16, wherein said threshold value for each animal is based at least in part on the amount of milk provided by each relevant animal during its last milking.

19. A method in accordance with claim 15, wherein said third range is approximately one-fourth of said second range.

* * * * *